(12) United States Patent
Grund-Pedersen et al.

(10) Patent No.: US 8,491,307 B2
(45) Date of Patent: Jul. 23, 2013

(54) INTERVENTIONAL SIMULATOR CONTROL SYSTEM

(75) Inventors: Jan Grund-Pedersen, Kullavik (SE); Fredrik Ohlsson, Torslanda (SE)

(73) Assignee: Mentice AB, Goteborg (DE)

( * ) Notice: Subject to any disclaimer, the term of this patent is extended or adjusted under 35 U.S.C. 154(b) by 24 days.

(21) Appl. No.: 10/538,011

(22) PCT Filed: Dec. 3, 2003

(86) PCT No.: PCT/SE03/01890
§ 371 (c)(1),
(2), (4) Date: Dec. 19, 2005

(87) PCT Pub. No.: WO2004/051601
PCT Pub. Date: Jun. 17, 2004

(65) Prior Publication Data
US 2006/0234195 A1     Oct. 19, 2006

Related U.S. Application Data

(60) Provisional application No. 60/430,346, filed on Dec. 3, 2002.

(30) Foreign Application Priority Data

Dec. 3, 2002 (SE) ..................................... 0203567

(51) Int. Cl.
*G09B 23/28* (2006.01)
(52) U.S. Cl.
USPC .......................................... 434/262; 434/267
(58) Field of Classification Search
USPC ................... 434/262, 267, 270, 271; 345/419
See application file for complete search history.

(56) References Cited

U.S. PATENT DOCUMENTS

| 3,406,601 | A | 10/1968 | Clifford |
| 3,426,448 | A | 2/1969 | Sarnoff |

(Continued)

FOREIGN PATENT DOCUMENTS

| EP | 0 456 103 | 11/1991 |
| EP | 0 316 763 | 8/1992 |

(Continued)

OTHER PUBLICATIONS

International Search Report.

(Continued)

*Primary Examiner* — Bruk Gebremichael
(74) *Attorney, Agent, or Firm* — Bryan Cave LLP

(57) ABSTRACT

An interventional procedure simulation system includes a control unit and an interface unit, the control unit communicating with the interface unit to simulate handling of a number of nested instruments simultaneously interfaced by said interface unit and, the instruments being arranged to move and rotated independently of each other and the movements and rotations being propagated to the other instruments. The control unit further includes an instruction set having a first instruction set for handling and processing input from the user, based on the input, generating a second instruction set for controlling the interface, a first data set that has characteristics for the instruments, a second data set that has data on a body part to be stimulated, and a third instruction set for generating control signals relating to an interaction between instruments and a surrounding geometry relating to a part of the simulated body part.

30 Claims, 9 Drawing Sheets

U.S. PATENT DOCUMENTS

| | | | |
|---|---|---|---|
| 3,520,071 A | 7/1970 | Abrahamson et al. | |
| 3,573,444 A | 4/1971 | Kawabata et al. | |
| 3,579,842 A | 5/1971 | Scher | |
| 3,722,108 A | 3/1973 | Chase | |
| 3,739,276 A | 6/1973 | Dornberger | |
| 3,919,691 A | 11/1975 | Noll | |
| 4,024,873 A | 5/1977 | Antoshkiw et al. | |
| 4,033,331 A | 7/1977 | Guss et al. | |
| 4,136,554 A | 1/1979 | Larson | |
| 4,182,054 A | 1/1980 | Wise et al. | |
| 4,250,887 A | 2/1981 | Dardik et al. | |
| 4,264,312 A | 4/1981 | Cianci | |
| 4,307,539 A | 12/1981 | Klein | |
| 4,545,390 A | 10/1985 | Leary | |
| 4,642,055 A | 2/1987 | Saliterman | |
| 4,646,742 A | 3/1987 | Packard et al. | |
| 4,726,772 A | 2/1988 | Amplatz | |
| 4,742,815 A | 5/1988 | Ninan et al. | |
| 4,748,984 A | 6/1988 | Patel | |
| 4,825,875 A | 5/1989 | Ninan | |
| 4,875,165 A | 10/1989 | Fencil et al. | |
| 4,907,973 A | 3/1990 | Hon | |
| 4,998,916 A | 3/1991 | Hammerslag et al. | |
| 5,048,508 A | 9/1991 | Storz | |
| 5,077,769 A | 12/1991 | Franciose | |
| 5,112,228 A | 5/1992 | Zouras | |
| 5,139,261 A | 8/1992 | Openiano | |
| 5,171,299 A | 12/1992 | Heitzman et al. | |
| 5,185,561 A | 2/1993 | Good et al. | |
| 5,196,017 A | 3/1993 | Silva et al. | |
| 5,215,523 A | 6/1993 | Williams et al. | |
| 5,246,007 A | 9/1993 | Frisbie et al. | |
| 5,257,462 A | 11/1993 | Buttermann et al. | |
| 5,279,563 A | 1/1994 | Brucker et al. | |
| 5,314,339 A | 5/1994 | Aponte | |
| 5,315,665 A * | 5/1994 | Ohhashi | 382/131 |
| 5,318,533 A | 6/1994 | Adams et al. | |
| 5,324,260 A | 6/1994 | O'Neill et al. | |
| 5,368,565 A | 11/1994 | DeLong | |
| 5,380,307 A * | 1/1995 | Chee et al. | 604/264 |
| 5,385,549 A | 1/1995 | Lampropoulos et al. | |
| 5,389,865 A | 2/1995 | Jacobus et al. | |
| 5,397,308 A | 3/1995 | Ellis et al. | |
| 5,403,191 A | 4/1995 | Tuason | |
| 5,423,754 A | 6/1995 | Cornelius et al. | |
| 5,425,709 A | 6/1995 | Gambale | |
| 5,430,665 A | 7/1995 | Jin et al. | |
| 5,464,410 A | 11/1995 | Skeens et al. | |
| 5,492,530 A | 2/1996 | Fischell et al. | |
| 5,548,694 A | 8/1996 | Frisken Gibson | |
| 5,584,701 A | 12/1996 | Lampotang et al. | |
| 5,599,301 A | 2/1997 | Jacobs et al. | |
| 5,605,531 A | 2/1997 | Lane et al. | |
| 5,623,582 A | 4/1997 | Rosenberg | |
| 5,651,775 A | 7/1997 | Walker et al. | |
| 5,680,590 A | 10/1997 | Parti | |
| 5,695,500 A | 12/1997 | Taylor et al. | |
| 5,731,804 A | 3/1998 | Rosenberg | |
| 5,749,853 A | 5/1998 | O'Donnell et al. | |
| 5,755,577 A | 5/1998 | Gillio | |
| 5,766,016 A | 6/1998 | Sinclair et al. | |
| 5,769,640 A | 6/1998 | Jacobus et al. | |
| 5,771,181 A | 6/1998 | Moore et al. | |
| 5,800,179 A | 9/1998 | Bailey | |
| 5,805,140 A | 9/1998 | Rosenberg et al. | |
| 5,807,377 A | 9/1998 | Madhani et al. | |
| 5,808,665 A | 9/1998 | Green | |
| 5,821,920 A | 10/1998 | Rosenberg et al. | |
| 5,828,197 A | 10/1998 | Martin et al. | |
| 5,831,408 A | 11/1998 | Jacobus et al. | |
| 5,882,206 A | 3/1999 | Gillio | |
| 5,889,672 A | 3/1999 | Schuler et al. | |
| 5,987,960 A * | 11/1999 | Messner et al. | 73/1.79 |
| 6,037,927 A | 3/2000 | Rosenberg | |
| 6,038,488 A * | 3/2000 | Barnes et al. | 700/161 |
| 6,062,865 A | 5/2000 | Bailey | |
| 6,106,301 A | 8/2000 | Merril | |
| 6,120,465 A | 9/2000 | Guthrie et al. | |
| 6,191,796 B1 | 2/2001 | Tarr | |
| 6,267,599 B1 | 7/2001 | Bailey | |
| 6,323,837 B1 | 11/2001 | Rosenberg | |
| 6,443,735 B1 | 9/2002 | Eggert et al. | |
| 6,470,302 B1 | 10/2002 | Cunningham et al. | |
| 6,538,634 B1 * | 3/2003 | Chui et al. | 345/156 |
| RE38,242 E | 9/2003 | Engel et al. | |
| 6,773,263 B2 * | 8/2004 | Nicholls et al. | 434/267 |
| 6,775,399 B1 * | 8/2004 | Jiang | 382/128 |
| 6,785,572 B2 | 8/2004 | Yanof et al. | |
| 6,842,638 B1 * | 1/2005 | Suri et al. | 600/425 |
| 6,857,878 B1 | 2/2005 | Chosack et al. | |
| 6,876,891 B1 | 4/2005 | Schuler et al. | |
| 6,929,481 B1 * | 8/2005 | Alexander et al. | 434/262 |
| 6,939,138 B2 * | 9/2005 | Chosack et al. | 434/262 |
| 7,056,123 B2 * | 6/2006 | Gregorio et al. | 434/272 |
| 7,156,664 B2 | 1/2007 | Wallaker | |
| 7,191,110 B1 | 3/2007 | Charbel et al. | |
| 7,215,326 B2 | 5/2007 | Rosenberg | |
| 7,371,067 B2 | 5/2008 | Anderson et al. | |
| 2001/0016804 A1 * | 8/2001 | Cunningham et al. | 703/7 |
| 2001/0055748 A1 * | 12/2001 | Bailey | 434/262 |
| 2002/0137014 A1 * | 9/2002 | Anderson et al. | 434/262 |
| 2002/0168618 A1 * | 11/2002 | Anderson et al. | 434/262 |
| 2003/0069719 A1 * | 4/2003 | Cunningham et al. | 703/7 |
| 2004/0015070 A1 * | 1/2004 | Liang et al. | 600/407 |
| 2004/0234933 A1 * | 11/2004 | Dawson et al. | 434/262 |
| 2006/0127864 A1 | 6/2006 | Ohlsson | |
| 2006/0234195 A1 | 10/2006 | Grund-Pedersen et al. | |

FOREIGN PATENT DOCUMENTS

| | | |
|---|---|---|
| EP | 0 571 827 | 12/1993 |
| EP | 0 970 714 | 1/2000 |
| EP | 0 632 709 | 3/2002 |
| FR | 2 592 514 | 7/1987 |
| GB | 2 252 656 | 8/1992 |
| GB | 2 288 686 | 10/1995 |
| JP | 8030185 | 2/1996 |
| JP | 10-094519 | 4/1998 |
| JP | 2000-342692 | 12/2000 |
| JP | 2001-046496 | 2/2001 |
| WO | WO 91/06935 | 5/1991 |
| WO | WO 91/11775 | 8/1991 |
| WO | WO 92/16141 | 10/1992 |
| WO | WO 95/02233 | 1/1995 |
| WO | WO 96/16389 | 5/1996 |
| WO | WO 96/28800 | 9/1996 |
| WO | WO 99/39317 A1 | 8/1999 |
| WO | WO 01/56491 A2 | 8/2001 |
| WO | WO 01/78039 | 10/2001 |
| WO | WO 01/88882 | 11/2001 |
| WO | WO 02/059859 A1 | 8/2002 |
| WO | WO 02/070980 A1 | 9/2002 |

OTHER PUBLICATIONS

International Search Report for International application No. PCT/SE2003/001891 dated Apr. 15, 2004.

T. Yamaguchi, *Computational Biomechanics Simulation as a Means of Life Science*, Journal of the Japan Society for Simulation Technology, Dec. 1999, vol. 18, No. 4 (with English translation of abstract).

S. Guo et al., *A Study of Active Catheter System*, Journal of Jap. Robotics Society; Sep. 1996, vol. 14, No. 6 (with English translation of abstract).

Japanese Office Action dated Feb. 10, 2009 in corresponding Japanese patent application No. 2004-557051 (with English translation).

International Search Report for PCT/SE2003/001893 dated Feb. 18, 2004.

International Search Report for PCT/SE2003/001892 dated Feb. 18, 2004.

Tao Bo Computer Science and Technology, China Academic Journal Electronic Publishing House "Compression of Microvascular Network Image Based on Description," (Feb. 15, 1996) and English translation thereof.

Office Action for co-pending U.S. Appl. No. 10/583,005 mailed Jul. 14, 2010.

Notice of Allowance for co-pending U.S. Appl. No. 10/538,007 mailed Aug. 19, 2011.

Baumann et al., "Force Feedback for Virtual Reality Based Minimally Invasive Surgery Simulator", Medicine Meets Virtual Reality IV: Health Care in the Information Age, pp. 564-579, Jan. 1996.

Beer-Gabel, "Computer Assisted Training in Endoscopy (C.A.T.E.): From a Simulator to a Learning Station", Endoscopy 1992; 24: Suppl. 2: 534-538.

Bostrom, et al., "Design of an Interactive Lumbar Puncture Simulator with Tactile Feedback", IEEE, pp. 280-286, Sep. 1993.

Bostrom, et al., "Design of Hardware for Simulating Lumbar Puncture with Force Feedback", Thayer School of Engineering, Control Applications & Robotics Laboratory, pp. 1-17, Mar. 17, 1993.

Brochure: Dynacath, Minneapolis, MN.

Burdea, "Force and Touch Feedback for Virtual Reality", Physical Modeling, Chapter 7, John Wiley & Sons, Inc., pp. 168-223, 1996.

Cover et al., "Interactively Deformable Models for Surgery Simulation," IEEE Computer Graphics and Applications, 0272-17-16/93/1100-0068, pp. 68-75.

Curtis et al., "Simulation of ERCP with Computer Generated Imagery and a "Reality Engine" Computer", Clinical Endoscope Practice, §93, 1995.

Daane et al., "A $100 Surgical Simulator for the IBM PC", Interactive Technology and the New Paradigm for Healthcare, Jan. 1995, 79-80.

Dumay, "Cybersurgery", Medicine Meets Virtual Reality II: Interactive Technology & Healthcare, Jan. 1994.

Gillies et al., "An Interactive Graphic Simulator for the Teaching of Fibrendoscopic Techniques", Eurographics 1987, pp. 127-138.

Haritsis, et al., "Computer Simulation: New Horizons in Endoscopy Teaching", Hellenic Journal of Gastroenterology, 51:54-63, 1992.

Haritsis, et al., "Realistic Generation and Real Time Animation of Images of the Human Colon", Computer Graphics Forum, vol. II, No. 3, pp. C367-C380, 1992.

Higgins et al., "Virtual Reality Surgery: Implementation of a Coronary Angioplasty Training Simulator", Surgical Technology International IV, pp. 379-383, Oct. 1995.

Higgins, "Medical Simulation for Trauma Management," U.S. Army Medical Research Grant Annual Report, Grant No. DAMD17-94-J-4470, Oct. 1995.

Hon, "Ixion's Laparoscopic Surgical Skills Simulator", Medicine Meets Virtual Reality II: Interactive Technology & Healthcare, pp. 81-83, Jan. 1994.

Hon, "Ixion's Realistic Medical Simulations", Virtual Reality World, Jul./Aug. 1994, pp. 59-62.

Hon, "Tactile and Visual Simulation: A Realistic Endoscopy Experience", Medicine Meets Virtual Reality: Discovering Applications for 3-D Multi-Media Interactive Technology in the Health Sciences, Jun. 4-7, 1992.

Isaacs, et al., "Controlling Dynamic Simulation with Kinematic Constraints, Behavior Functions and Inverse Dynamics", Computer Graphics, vol. 21, No. 4, pp. 215-224, 1987.

Iwata, "Artificial Reality with Force-feedback: Development of Desktop Virtual Space with Compact Master Manipulator", Computer Graphics, vol. 24, No. 4, pp. 165-170, 1990.

Jackson, et al., "Force Feedback and Medical Simulation", Interactive Technology and the New Paradigm for Healthcare, Jan. 1995, 147-151.

Kuenhapfel et al., "CAD-Based Graphical Computer Simulation in Endoscopic Surgery", End. Surg. 1993; 1:181-184.

Kuhn et al., "Karlsruhe Endoscopic Surgery Trainer: A 'Virtual Reality' based Training System for Minimally Invasive Surgery", 1996.

Kuhnapfel et al., "CAD-Based Simulation and Modelling for Endoscopic Surgery", Institute fur Angewandte Informatik, Kernforschungszentrum Karlsruhe, Germany, Oct. 1994.

Kuhnapfel, "Realtime Graphical Computer Simulation for Endoscopic Surgery", Medicine Meets Virtual Reality II: Interactive Technology & Healthcare, Jan. 1994.

Kuhnapfel, et al., "Endosurgery Simulations with KISMET." Virtual Reality World, pp. 165-171, 1995.

McDonald et al., "Virtual Reality Technology Applied to Anesthesiology", Interactive Technology and the New Paradigm for Healthcare, 237-243, Jan. 1995.

McGovern et al., "The Virtual Clinic™, A Virtual Reality Surgical Simulator", Medicine Meets Virtual Reality II: Interactive Technology & Healthcare, Jan. 1994, pp. 150-157.

Meglan, "Making Surgical Simulation Real", Computer Graphics, pp. 37-39, Nov. 1996.

Meglan et al., "The Teleos Virtual Environment Toolkit for Simulation-Based Surgical Education", Medicine Meets virtual Reality IV: Health Care in the Information Age, 346-351, Jan. 1996.

Merck & Co., Inc., "An Introduction to the Robotic Endoscopy Simulator", 1989.

Merril et al., :"Virtual Reality for Trade Shows and Individual Physician Training", Virtual Reality Systems, pp. 40-44.

Merril et al., "Changing the Focus of Surgical Training", Virtual Reality World, Mar./Apr. 1995, pp. 56-60.

Merril et al., "Cyber Surgery: Cutting Costs, Sewing Benefits", Virtual Reality Special Report, 1994, pp. 39-41.

Merril et al., "Photorealistic Interactive Three-Dimensional Graphics in Surgical Simulation", Interactive Technology and the New Paradigm for Healthcare, Jan. 1995, pp. 244-252.

Merril et al., "Surgical Simulation Using Virtual Reality Technology: Design, Implementation, and Implementations". Surgical Technology International III, Oct. 1994, pp. 77-85.

Merril et al., "Virtual Heart Surgery: Trade Show and Medical Education", Virtual Reality World, Jul./Aug. 1994, pp. 55-57.

Merril, "Presentation Material: Medicine Meets Virtual Reality II Interactive Technology & Healthcare," Medicine Meets Virtual Reality II: Interactive Technology & Healthcare, Jan. 1994.

Merril, "Surgery on the Cutting Edge", Virtual Reality World, Nov./Dec. 1993, pp. 34-38.

Merril, "VR for Medical Training and Trade Show Fly-Paper", Virtual Reality World, May/Jun. 1994, pp. 53-57.

Merril, et al., "Revealing the Mysteries of the Brain with VR", Virtual Reality Special Report, Winter 1994, pp. 61-65.

Metaxas, et al., "Dynamic Deformation of Solid Primitives with Constraints", Computer Graphics Proceedings, Annual Conference Series, University of Toronto, pp. 309-312, Jul. 1992.

Noar et al., "Endoscopy Simulation Training Devices", Endoscopy 1992; 24: 159-166.

Noar, "Robotics Interactive Endoscopy Simulation of ERCP/Sphincterotomy and EGD," Endoscopy 1992; 24, Suppl. 2: 539-541.

Official Proceedings of Virtual Reality and Medicine the Cutting Edge, "Immersion Virtual Catheter/Virtual laparoscopic Interface", 1994.

Peifer et al., "Applied Virtual Reality for Simulation of Endoscopic Retrograde Cholangio-Pancreatography (ERCP)", Medicine Meets virtual Reality IV: Health Care in the Information Age, Jan. 1996, pp. 36-42.

Popa Thesis, "Simulation of Lumbar Puncture Procedure using Force Feedback in Virtual Environments", Thayer School of Engineering, Jun. 1994.

Rosenberg et al., "A Haptic Interface for Virtual Simulation of Endoscopic Surgery", Medicine Meets virtual Reality IV: Health Care in the Information Age, Jan. 1996.

Rosenberg, et al., "Foot-Based Interfaces to Virtual Environments Using the Immersion Interface Box™", Proceedings: Virtual Reality and Persons with Disabilities, Second Annual International Conference, pp. 145-148.

Saliterman, M.D., "A Computerized Simulator for Critical-Care Training: New Technology for Medical Education ", Mayo Clin Proc 65:968-978, 1990.

Singh, et al., "Design of an Interactive Lumbar Puncture Simulator with Tactile Feedback", IEEE, pp. 1734-1739, May 1994.

Sukthankar, "Towards Virtual Reality of "Tissue Squeezing": A Feasibility Study", Medicine Meets Virtual Reality II: Interactive Technology & Healthcare, Jan. 1994, pp. 182-186.

Taylor Computer Procedures, "Computer Procedures for Finite Element Analysis", The Finite Element Method, McGraw Hill, pp. 677-757, 1977.

Terzopoulos, "Dynamic 3D Models with Local and Global Deformations: Deformable Superquadrics" IEEE Transactions on Pattern Analysis and Machine Intelligence, vol. 13, No. 7, pp. 703-714, Jul. 1991.

VR in Medicine [online], Apr. 1996 [retrieved on Feb. 5, 2009]. Retrieved from the Internet: <URL: http://dspace.dial.pipex.com/town/parade/ad828/vr.html.

Williams et al., "Teaching Gastrointestinal Endoscopy by Computer Simulation: A Prototype for Colonsocopy and ERCP", Gastrointestinal Endoscopy, vol. 36, No. 1, 1990, pp. 49-54.

* cited by examiner

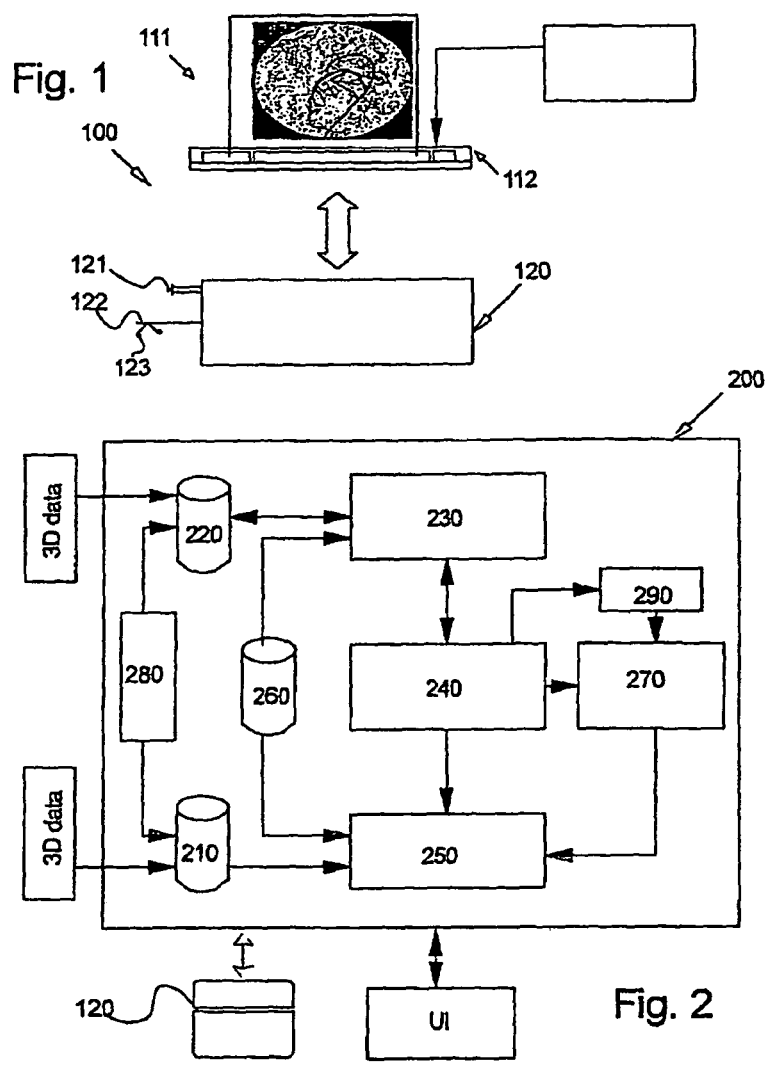

INTERVENTIONAL SIMULATOR CONTROL SYSTEM

CROSS-REFERENCE TO RELATED APPLICATIONS

This application is a National Stage of International Application No. PCT/SE03/01890, filed on Dec. 3, 2003, which claims the benefit of U.S. Provisional Application No. 60/430,346, filed on Dec. 3, 2002. This application also claims the benefit of Swedish Patent Application No. 0203567-3, filed on Dec. 3, 2002. The disclosures of each of the above applications are incorporated herein by reference.

TECHNICAL FIELD OF THE INVENTION

The present invention relates to a computerized apparatus for simulating an interventional operation, and in particular the simulator portion of the arrangement.

BACKGROUND OF THE INVENTION

Principles of adult education, tenets of experiential learning, and theories addressing the development of expertise have all underscored the critical role experience plays in the learning process. State-of-the-art simulations can be successfully included in contemporary surgical and medical education to offer trainees and practicing physicians the requisite learning experiences based on these educational underpinnings. All learners can be offered opportunities to acquire the essential skills and to achieve specified competency levels based on standardized learning experiences. Simulations can be used to facilitate learning through the evaluation of performance and provision of immediate, individualized, and detailed feedback. Simulations offer controlled settings that allow repetition until the defined performance levels are achieved, decrease stress levels of learners, increase the confidence levels of learners, and increase safety in real settings by assuring the achievement of technical competence prior to work on patients. Practicing physicians can improve their skills and can learn new procedures emerging as a result of advances in science and technology through educational interventions involving the use of simulations. In addition, the use of simulations can help address practical issues, such as the demands on faculty time, by providing trainees the opportunities for independent learning and practice. The current emphasis on accountability and on assurance of the quality of health care may also be addressed through the use of such simulations and data on outcomes can be used to assure the public of the competence of physicians.

Simulations should be considered an essential part of every contemporary educational program that addresses technical skills development. They can be used to ensure effective teaching and learning, to provide valid and reliable means of assessment of the skills of learners, to yield information on specific weaknesses that require improvement, and to create individual proinstruction sets of the technical ability of learners. In order to achieve the desired results, specific curricula should be developed based on principles of adult education, experiential learning, and effective feedback. Such simulations may also be used in programs of continuing professional education and certification. The initial investment of resources needed for the development and acquisition of simulations and for the creation of training programs that incorporate them effectively in educational models is readily offset by the numerous advantages resulting from expeditious performance of procedures in the operating room, enhancement of patient safety, and decrease in the faculty time needed to teach learners various technical skills. Such simulations may also be used to assess the effectiveness of educational efforts and even to select individuals for training. Thus, the simulations have the potential to make a major impact on programs of surgical and medical education of the future.

As a result of the rapid developments within the computer technique, simulations, especially for the purpose of surgical and medical education, have improved considerably. However, the presently known apparatus and methods do not allow a full range simulation of different instruments used.

U.S. Pat. No. 6,106,301 discloses an interventional radiology interface apparatus and method interfaces peripherals in the form of mock medical instruments to a medical procedure simulation system to enable performance of a medical procedure on a virtual patient. The interface apparatus includes a guidewire, catheter and sheath, an injection syringe, an inflation syringe and a foot switch to realistically simulate the instruments utilized during an actual medical procedure. A user manipulates guidewire, catheter and sheath peripherals to traverse an arterial network toward a simulated blockage shown on the medical procedure simulation system display. The foot switch controls the display to provide a fluoroscope image showing the position of the guidewire, catheter, sheath and blockage within the arterial network. The injection syringe may be manipulated to simulate injections of contrast fluid or other pharmaceutical substances through the catheter or sheath into the virtual patient. When a guidewire is positioned past the simulated blockage within the arterial network, the catheter is exchanged for a balloon-tipped angioplasty catheter, and the inflation syringe is manipulated to simulate inflation of the balloon to reduce the blockage. In addition, the interface apparatus may apply force feedback to the guidewire and catheter to simulate forces encountered by these instruments during an actual medical procedure. The interface apparatus measures peripheral manipulation and transfers these measurements via a processor to the medical procedure simulation system to enable simulation of the medical procedure. U.S. Pat. No. 6,267,599 discloses a system for producing highly realistic, real-time simulated operating condition for interactive training of persons to perform minimally invasive surgical procedures involving implements that are inserted and manipulated through small incisions in the patient. The virtual environment for this training system includes a housing with small opening. An implement simulating a surgical implement is inserted into the opening and manipulated relative to the housing. A movement guide and sensor assembly monitors the location of the implement relative to the housing and provides data about the implement's location and orientation within the housing. The reported data is interpolated by a computer processor, which utilizes a database of information representing a patient's internal landscape to create a computer model of the internal landscape of the patient. With reference to this computer model, the processor controls the occurrence of force feedback opposing the motion of the implement. A two-dimensional image representing the implement, as it would appear within the patient is generated by a processor-controlled video imaging system based on the computer model of the patient's internal landscape. This computer image of the implement is then merged with a video image loop of a patient's internal landscape as it appears through a heartbeat and breathing cycle, and the merged image is displayed on a video display. The combined elements of real-time visual representation and interactive tactile force feedback provide a virtual training simulation with all elements of actual operation conditions, minus a live patient. The system according to this invention handles only one instrument.

WO 02/070980 describes a system and method for simulating image-guided medical procedures, particularly those relying on interventional and/or diagnostic devices such as catheters. This document shows in a simplfied embodiment a system for simultaneously simulating a plurality of simulated instruments; however, real instruments cannot be used and they cannot be used and simulated with each other through the same interface. It is thus not possible to obtain a realistic simulation where instruments act nested with other and interact with each other.

SUMMARY OF THE INVENTION

The main object of the preferred embodiment of the invention is to present a novel and effective method and system for a real-time surgical simulations, preferably cardiovascular or endovascular diagnostic or interventional procedures.

The instructional system that is wrapped around the simulation provides a framework for learning.

Therefore, an interventional procedure simulation system, is provided comprising a control unit and an interface unit, the control unit communicating with the interface unit to simulate handling of a number of simulated instruments simultaneously interfaced by the interface unit, the control unit further comprising an instruction set, comprising: a first instruction set for handling and processing input from the user, based on the input, generating a second instruction set for controlling the interface, a first data set comprising characteristics for the instruments, a second data set comprising data on a body part to be simulated, and a third instruction set for generating control signals relating to an interaction between the simulated instruments and a surrounding geometry relating to a part of the simulated body part. The system of the invention can be used for many purposes, such as diagnostic, a cardiovascular or endovascular simulation system. Both real instruments and dummy instruments may be used; the instruments are simulated assuming that they interact nested, i.e. inserted into each other. A user's movements of the instruments, a surrounding simulated anatomy and other present instruments, affect a shape of an instrument simulated and displayed. Preferably, each instrument collisions with simulated surrounding calculations are executed by the control unit, which affects the shape and position of the instrument in the simulated body part. In the most preferred mode, a sum of all instrument properties is considered, such that each nested tool can be moved and rotated independently of the other and the movements and rotations are propagate to other instruments. For simulation purposes, an instrument is a distal part of a tool, or unique features at the distal end of a tool. Different instrument types can be used comprising balloons, stents, electrodes, wires, catheters, distal protection, etc. Each instrument type has different properties associated to it and provided as an instruction set, which describes substantially all properties of the instrument. Thus, it is possible to simulate new instruments by obtaining geometrical information on them. The properties of the instruments further describe interaction with surrounding geometry, visual properties, stiffness, shape etc.

In a preferred embodiment, the system comprises a model used for rendering objects depending on properties to be displayed and a collision model for computing collisions between the simulated instrument and body part. A model of the body or part of the body part is a three-dimensional data obtained through a body scanning.

The invention also relates to a method for simulating an interventional procedure, comprising the steps of: providing a control unit and an interface unit, the control unit communicating with the interface unit to simulate handling of a number of instruments simultaneously interfaced by the interface unit, providing a first instruction set for handling and processing input from the user, generating a second instruction set based on the input, for controlling the interface, retrieving information on the instrument comprising a first data set comprising characteristics for the instruments, providing a second data set comprising data on a body part to be simulated, and generating control signals relating to interaction between the instrument and a surrounding geometry by a third instruction set. The method also comprises simulating the instruments assuming that they interact nested, i.e. inserted into each other. The method also comprises changing instrument simulated and displayedbased on a user's movements of the instruments, a surrounding simulated anatomy and other present instruments, effect a shape of an instrument simulated and displayed. For nestled instruments, the method also comprises considering a sum of all instrument properties, such that each nested tool can be moved and rotated independently of the other and the movements and rotations propagate to other instruments. Preferably, an instrument is a distal part of a tool, or unique features at the distal end of a tool. As different instrument types can be used comprising balloons, stents, electrodes, wires, catheters, distal protection, etc., the invention is highly flexible. Each instrument type has different properties associated to it and provided as an instruction set, which describes substantially all properties of the instrument. The properties of the instruments further describe interaction with surrounding geometry, visual properties, stiffness, shape etc.

According to one aspect of the invention, a system for an interventional procedure simulation is provided. The system comprises a control unit and an interface unit, the system further comprising: means for communication between the control unit and the interface unit, means in the interface unit to simulate handling of a number of instruments simultaneously interfaced by the interface unit, interface member for receiving input from the user, means for handling and processing the input, means for controlling the interface, a first database for storing characteristics for the instruments, a second database for storing characteristics about a body part to be simulated, and means for generating control signals relating to an interaction between the simulated instruments and a surrounding geometry relating to a part of the simulated body part. The characteristics about a body part to be simulated are obtained through a scanning process.

The invention is best realized as a computer program for interventional procedure simulation in a system comprising a control unit and an interface unit, and the program comprises: a communication instruction set for communication between the control unit and the interface unit, a first instruction set for simulating handling of a number of simulated instruments simultaneously interfaced by the interface unit, the control unit further comprising an instruction set, comprising: a second instruction set for handling and processing input from the user, a third instruction set for controlling the interface, a first data set comprising characteristics for the instruments, a second data set comprising data on a body part to be simulated, a fourth instruction set for generating control signals relating to an interaction between the simulated instruments and a surrounding geometry relating to a part of the simulated body part, and a fifth instruction set for outputting simulation on a visualisation member.

The invention also concerns a program storage device readable by a machine and encoding a program of instructions for executing the computer program for interventional procedure simulation.

The invention also concerns a computer readable medium having computer readable program code embodied therein to enable an interventional procedure simulation in a system comprising a control unit and an interface unit, the program comprising: a communication instruction set for communication between the control unit and the interface unit, a first instruction set for simulating handling of a number of simulated instruments simultaneously interfaced by the interface unit, the control unit further comprising an instruction set, comprising: a second instruction set for handling and processing input from the user, a third instruction set for controlling the interface, a first data set comprising characteristics for the instruments, a second data set comprising data on a body part to be simulated, a fourth instruction set for generating control signals relating to an interaction between the simulated instruments and a surrounding geometry relating to a part of the simulated body part, and a fifth instruction set for outputting simulation on a visualisation member.

Moreover, the invention relates to a propagated signal for comprising a digitalized program code embodied therein to enable an interventional procedure simulation in a system comprising a control unit and an interface unit, the program comprising: a digitalized communication instruction set for communication between the control unit and the interface unit, a digitalized first instruction set for simulating handling of a number of simulated instruments simultaneously interfaced by the interface unit, the control unit further comprising an instruction set, comprising: a digitalized second instruction set for handling and processing input from the user, a digitalized third instruction set for controlling the interface, a digitalized first access code for accessing a first data set comprising characteristics for the instruments, a digitalized second access code for accessing a second data set comprising data on a body part to be simulated, a digitalized fourth instruction set for generating control signals relating to an interaction between the simulated instruments and a surrounding geometry relating to a part of the simulated body part, and a digitalized fifth instruction set for outputting simulation on a visualisation member.

The invention also relates to a system for an interventional procedure simulation, the system comprising a control unit and an interface unit, the system further comprising: means for communication between the control unit and the interface unit for receiving at least one instrument used in the interventional procedure, means for receiving three-dimensional information on a body part to be simulated, means for generating control signals relating to an interaction between the instruments and a surrounding geometry relating to a part of the simulated body part. The three-dimensional information is obtained through a scanning process.

The invention also relates to a system for an interventional procedure simulation learning, the system comprising a control unit and an interface unit, the system further comprising: means for communication between the control unit and the interface unit for receiving at least one instrument used in the interventional procedure, means for receiving three-dimensional information on a body part to be simulated, means for generating control signals relating to an interaction between the instruments and a surrounding geometry relating to a part of the simulated body part, and means for recording the simulation.

The invention also relates to a method of an interventional procedure training, using a system comprising a control unit and an interface unit, the method comprising: using an interventional procedure tool to be simulated in the interface device, simulating an interaction between the instruments and a surrounding geometry relating to a part of the simulated body part, using the simulation for training the user.

According to one aspect of the invention a method of facilitating an interventional procedure training, is provided by leasing a system comprising a control unit and an interface unit, the method comprising: using an interventional procedure tool to be simulated in the interface device, simulating an interaction between the instruments and a surrounding geometry relating to a part of the simulated body part, and using the simulation for training the user.

BRIEF DESCRIPTION OF THE DRAWINGS

In the following, the invention will be further described in a non-limiting way with reference to the accompanying drawings, in which:

FIG. 1 schematically illustrates a block diagram according to one embodiment of the invention, FIG. 2 is a block diagram illustrating the kernel set-up according to the invention.

DETAILED DESCRIPTION OF THE EMBODIMENTS

Figure 3:
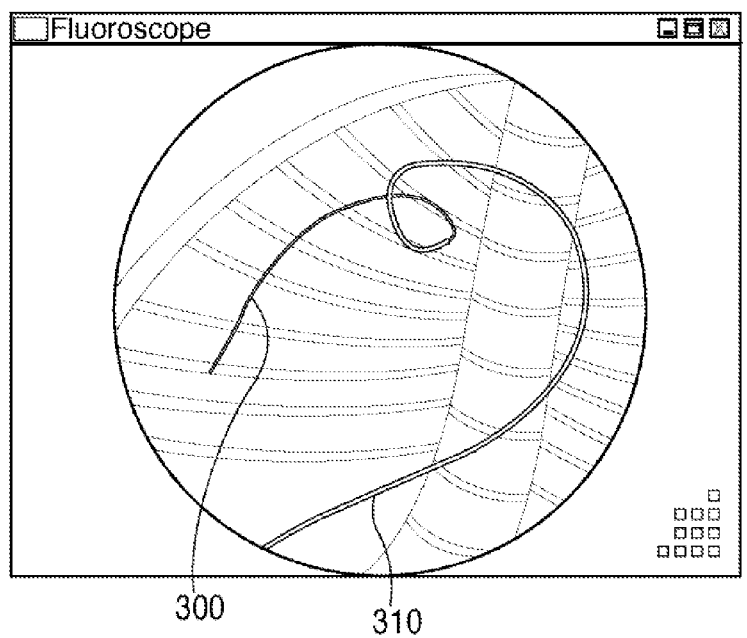
FIG. 3 is a fluoroscopic image generated with the system according to the invention.

An exemplary embodiment of a simulation apparatus according to the invention is schematically illustrated in FIG. 1. The apparatus 100 comprises a computer unit 110 and an interface device 120. The computer unit 110 can be a conventional PC or similar, or a unit integrated with the interface device 120. The computer unit according to this embodiment communicates with a display unit 111, an input device 112 such as a keyboard and a mouse, and a communication interface (not shown).

The interface device 120, described in a parallel application, entitled "AN INTERVENTIONAL SIMULATION DEVICE" (SE 0203568-1) by the same applicant and incorporation herein through reference, is arranged to receive a number instruments 121-123.

A user, e.g. a surgeon/physician, running a simulation uses the instruments connected to the interface device to practise a procedure.

Figure 5:
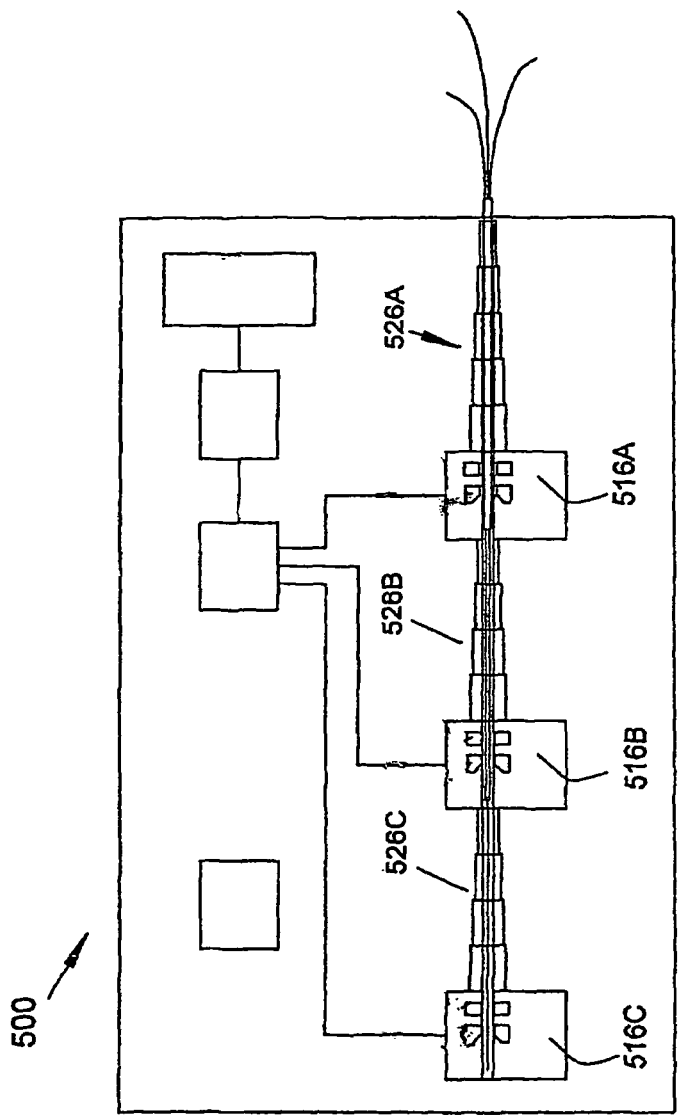
FIG. 5 is a schematic illustration of interface device according to one embodiment of the invention.

An interface device 500, schematically illustrated in FIG. 5, as a preferred embodiment, is arranged to receive a number of instruments, dummies/real, preferably at least two instruments. The device comprises a number of moveable carriages 516A-516C corresponding to the number of the instruments, a common track 520, and an interconnecting member 526 provided as a telescopic tube. The interconnecting member 526 interconnects the carriages 516A-516C serially. Each carriage is provided with an opening for enabling reception of the instruments. Each carriage 516A-516C further comprises members to receive and lock at least one of the instruments, and members for receiving a movement from the instrument dummy and generating a force fed back to the instrument dummy with respect to a simulation characteristic. Preferably, each carriage comprises a detecting arrangement for detecting the type of the instrument dummy inserted through the interconnecting member. The interface device is connected to the control unit (PC) to measure the movement of each carriage and regulate the movement by means of a speed regulator and a distance regulator. Each carriage is connected with a gear belt transmission for driving along the track 520. Each carriage is provided with a crank block, which is arranged on a torque wheel. The crank block is provided with a mating surface, which is pressed towards a collet that grips the instrument wire. Moreover, each carriage is arranged with an outlet, which is provided with a detecting member, which detects presence of an instrument in the carriage. The detecting member is arranged to detect the thickness of each instrument. The optical sensor detects presence of an instrument in the carriage. The control unit measures a longitudinal movement and a movement of rotation, of the instrument and gives force-feedback in the longitudinal direction and in the direction of rotation, of the instrument according to received force and torque. A locking member is arranged to clamp an instrument, which instrument is attached to a central wall. The locking member comprises a torque wheel, which is arranged in the central wall. The crank block is provided inside the torque wheel, which crank block moves in longitudinal direction. The crank block is fixed in the direction of rotation.

The core of the system is a control kernel, best embodied in form of a software based control system, which is loaded into the memory of the computer unit. Then, the software kernel loads a three-dimensional geometry, e.g. representing vessels, heart, etc, and tool descriptions. The representations are preferably provided as data files comprising for example length segments (with variable length) ), diameter (inner and outer), angel with respect to the preceding (shape), rigidity, if there is a balloon or EPD, or electrode tip, etc., "radioopacity", etc., pressure table for the balloon and so on.

The movements of the tools are registered by the interface device and fed back to the kernel. There, the supposed position and shape of the tool is calculated. The result is displayed as a synthetic fluoroscopic image on the display 111. An important and novel issue is that in all applications, nested tools are used and all are active. The instruments can be manipulated independently at any time, and will affect each other all the time.

Figure 6:
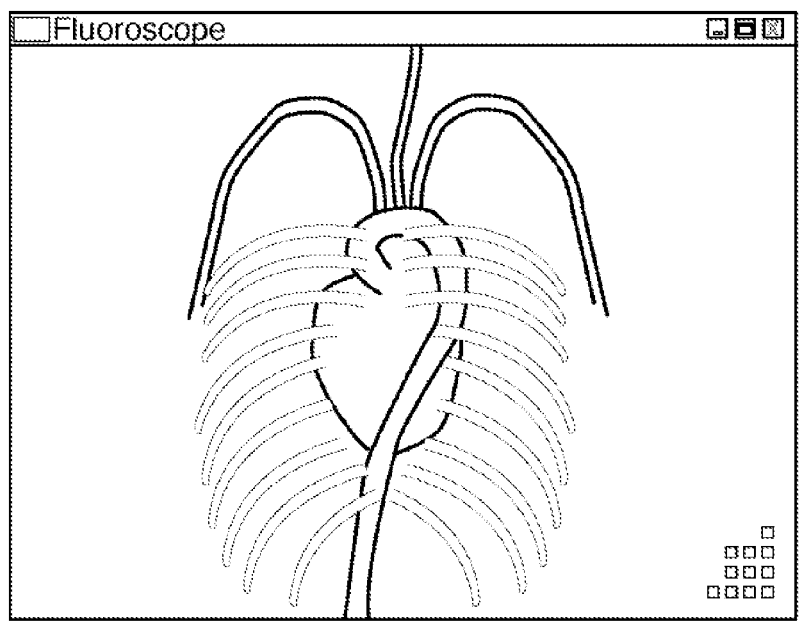
FIG. 6 illustrates an image of Visible Models.

The kernel 200 is schematically illustrated in FIG. 2. In simulation, a patient is represented by a three-dimensional geometry. Each "organ" of a patient is separate, with different visible/physical properties, for example a bone is denser than vessels, a kidney has low visibility but gradually becomes more visible as a contrast medium is injected, and can be animated independently (e.g. the heart and lungs have different frequencies). The 3D geometry are provided in two representations:

Visible Models (VMs) 210 are used for rendering purposes, see for example FIG. 6. Depending on properties they are displayed differently on the fluoroscopic display. The density for different tissues is reflected in the visibility properties.

Figure 7:
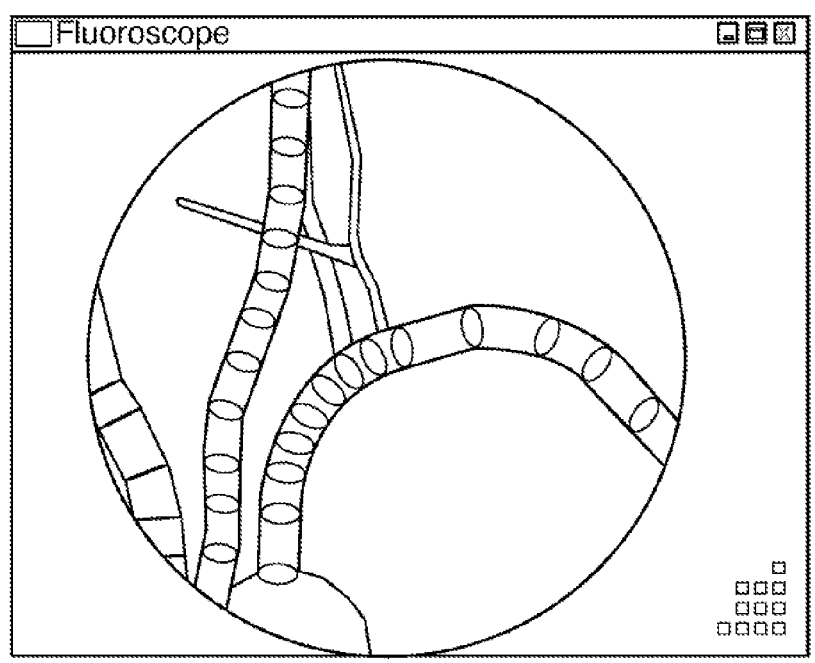
FIG. 7 illustrates an image of Collision Geometries.
Figure 8:
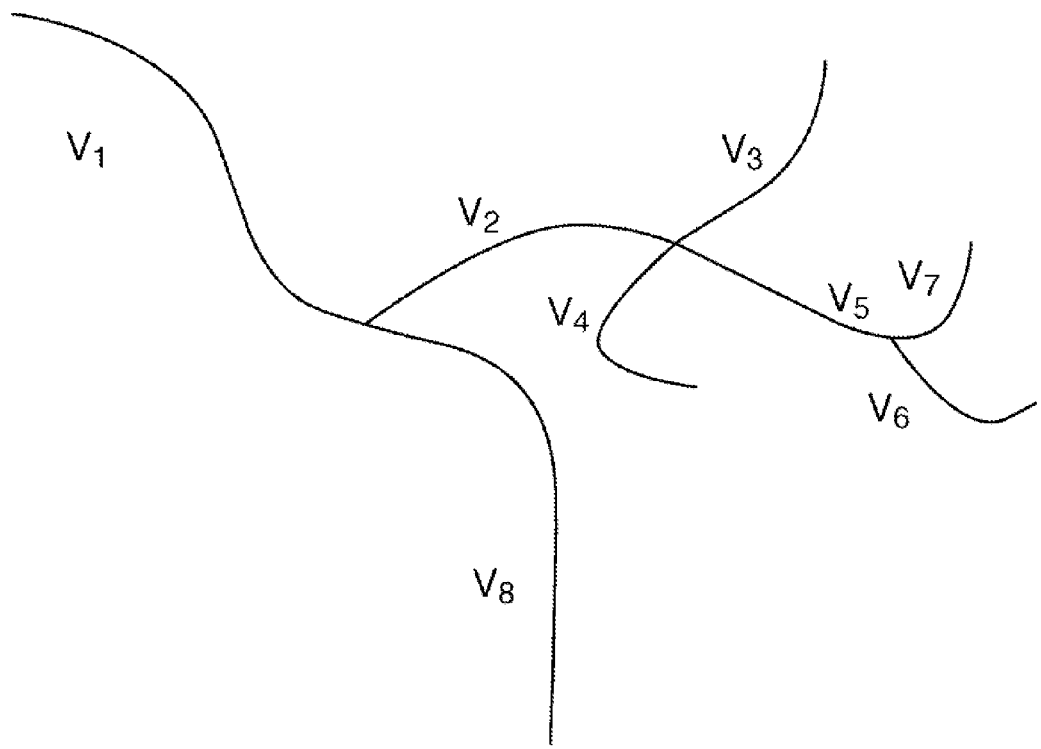
FIG. 8 illustrates a schematic vessel structure.
Figure 9:
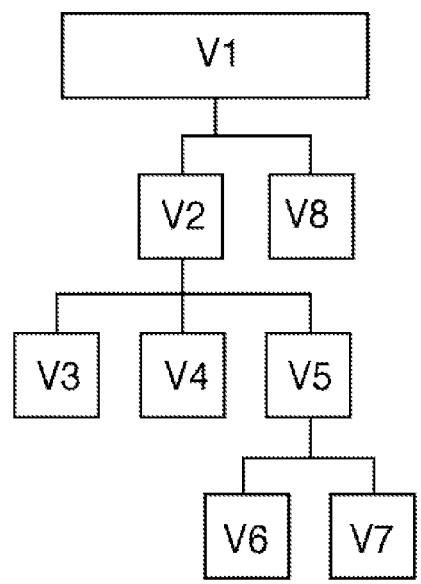
FIG. 9 is a structured vessel hierarchy according to FIG. 8, and FIGS. 10 and 11 are images of user interfaces according to one embodiment of the invention.

Coupled to the VMs are Collision Geometries (CGs) 220. Each vessel segment, for example, consists of connected cones (each vessel segment consists of many cones). One example is illustrated in FIG. 7. According to the most preferred embodiment of the invention, the vessels are arranged in a hierarchy. All vessels are provided in a database having a structured hierarchy as illustrated in FIGS. 8 and 9, which tells how vessels connect. Subfunctions such as Haptics 230, Physics 240, Tools 260, Fluids 270, Dye 290 etc., (further described in the following) use these to compute collisions, forces, fluid flows, etc. The CGs are not visible, and usually have less resolution than the corresponding Model. However, a change in a CG will also result in a change in the corresponding Model (described in more detail below.) The CG also has properties (per cone), which reflect stiffness; e.g., normal vessels have the same stiffness, but a lesion can be calcified and hence stiffer. Depending on, for example the vessel stiffness, the same tool could interact differently with different parts of a vessel.

FIG. 3 illustrates a fluoroscopic image of a cardiovascular procedure. The system reproduces the physics and physiology of the human cardiovascular system in the thorax. This simulation can be combined with a haptic interface (230) to provide the user with an intuitive way to interact with the simulation. In this case, the training system consists of the software simulation of the cardiovascular system, the haptic interface device, the instructional system and two monitors, one for the synthetic x-ray and one for the instructional system. The simulation consists of modules replicating the haemodynamics, blood flow and dye contrast media mixing, and catheter-vasculature physical interaction. In addition, a module produces a synthetic x-ray image to replicate the fluoroscopic image used by interventional cardiologists to guide them during their work. The algorithms used in the simulator are adapted from the cardiovascular modeling and analysis literature. The vessels 300 and a catheter 310 are illustrated in the image.

The 3D geometry (both VMs and CGs) can be constructed in different ways:
They can be modeled in a 3D modeling software, i.e. from scratch using anatomy books, video clips, etc as references only.
They can be reconstructed from real patient data, e.g. obtained through scans with CT, MRI, Ultrasound, fluoroscope, etc.

Thus, for the software kernel, it is not important how the 3D geometry is constructed, and according to one of the most important features of the invention, a real-time simulation can be obtained as soon as patient data is optioned in three dimensions.

A Physics function 240 calculates the "behavior" of the instruments; Instruments in this context meaning long, flexible instruments, either hollow tubes or rigid wires. The instruments are nested (inside each other) and the maximum number of simultaneous tools according to this embodiment is three. Each tool has its properties, i.e. "natural shape", stiffness, length, diameters, radioopacity, etc. The properties are described in separate instruction sets for each instrument. The instruction sets are stored in a data storing means 260. The user's movements, surrounding anatomy and other present tools, will affect the shape of the tool. For each tool, collisions with the CG are calculated (for each tool only the part that is outside any other tool), which affects the shape and position of it. In the case of nested tools, the "sum" of all tool properties is considered. A catheter, for example, with a wire inside will act stiffer than the catheter alone. In addition, the shape of the catheter will be different with and without the wire inside (if the wire is relatively stiff compared to the catheter). Each nested tool can be moved and rotated independently of the other, due to the structure of the interface device. These movements and rotations will propagate to the other tools.

Each instrument consists of a number of line segments represented by (dynamic) vectors. Dynamic vectors can have variable length. These are not evenly spaced, but depending on the curvature of the instruments, the space varies. The spacing of line segments changes as the instrument moves and bends.

The Physics Function 240 also calculates forces, both contact forces at each contact point (along each instrument and at the tip) and the forces that can be felt "at the base" (where the user holds the instruments). The forces are thus simulated and felt by the user through the interface device.

Preferably, by a tool is meant a distal part of an instrument, or unique features at the distal end of an instrument. Different tool types can be balloons, stents, electrodes, wires, catheters, distal protection, etc. Each unique "instrument" belongs to a tool type. Each tool type has different properties associated to it, e.g. a balloon type has a pressure table that describes the shape under different pressures. Consequently, an instrument of the type balloon then has its own unique pressure table. In other words: For each unique instrument, there is a instruction set, which describes all properties, e.g. stiffness, shape etc., described in the Physics above, and for instance a pressure table. In one application, for example, there can be more than 40 different balloons, but all of the same type.

The properties of the tools can be such that they describe interaction with surrounding geometry, or they can be more visual properties. As an example: A balloon expands under pressure. Ideally, it would expand according to a pressure table. However, the surrounding geometry will hold back the expansion. Depending on the "stiffness" of the vessel and the "stiffness" of the balloon itself the result will be different. The balloon also has two marker points. These are characteristic for balloons, but are only visual cues for the length of the balloon.

According to one embodiment, following exemplary tool types can be used:
0.035" guide wire
Guide catheter
Balloon
Balloon expandable stent
Self expandable stent
Electrode
"Coronary" (0.014") wire
Embolic protection device filter
Embolic protections device sheath
Diagnostic catheter
Middle guide catheter The surgical simulations are usually done as cardiovascular operations. Thus, for the simulation purposes, the fluid flow (blood) is "pre-calculated", and done dependent on the geometry, e.g. long, narrow vessels will have lower flow than large, wide vessels. Each time the geometry changes (opened by a balloon, blocked by a balloon, etc.) the flow is recalculated. Preferably, as long as the geometry does not change the flow stays the same. As stated above, the flow depends on the geometric model. However, if the flow-splits are known for any bifurcations, then this can be given to the flow model as a starting statement.

It should be noted that it is possible to expand any vessel with a balloon, and the flow will be affected accordingly.

During a surgical operation, a contrast can be injected through hollow instruments. The contrast has its own speed and directions when it comes out of the instrument. Soon it is mixed with the blood, change direction and speed, and eventually "fade" out.

The system contains a dye simulation. A "Dye model" 290 calculates this behavior, and keeps track of the position currently having enough concentration of contrast to be visually seen on the fluoroscopic image. Dye uses the CGs to compute this, but renders on the VMs. To make this procedure quick, there is a mapping table executed in a pre-processor.

The system also comprises a Lesion Model 280. A lesion is currently only a narrowing of a vessel, which might have different properties than the rest of the vessel. It is accomplished in two ways: Either the 3D geometry is already provided with the lesion, which affects the fluid flow and makes it visible, or it can be applied on a "healthy" vessel. A lesion in the latter meaning would then only be a geometric deformation of the 3D geometry, together with some special properties for that part of the vessel segment. The properties may include stiffness, "vulnerability", i.e. the risk that it will break and cause emboli to break off, and more.

Figure 10:
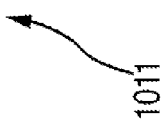
Figure 11:
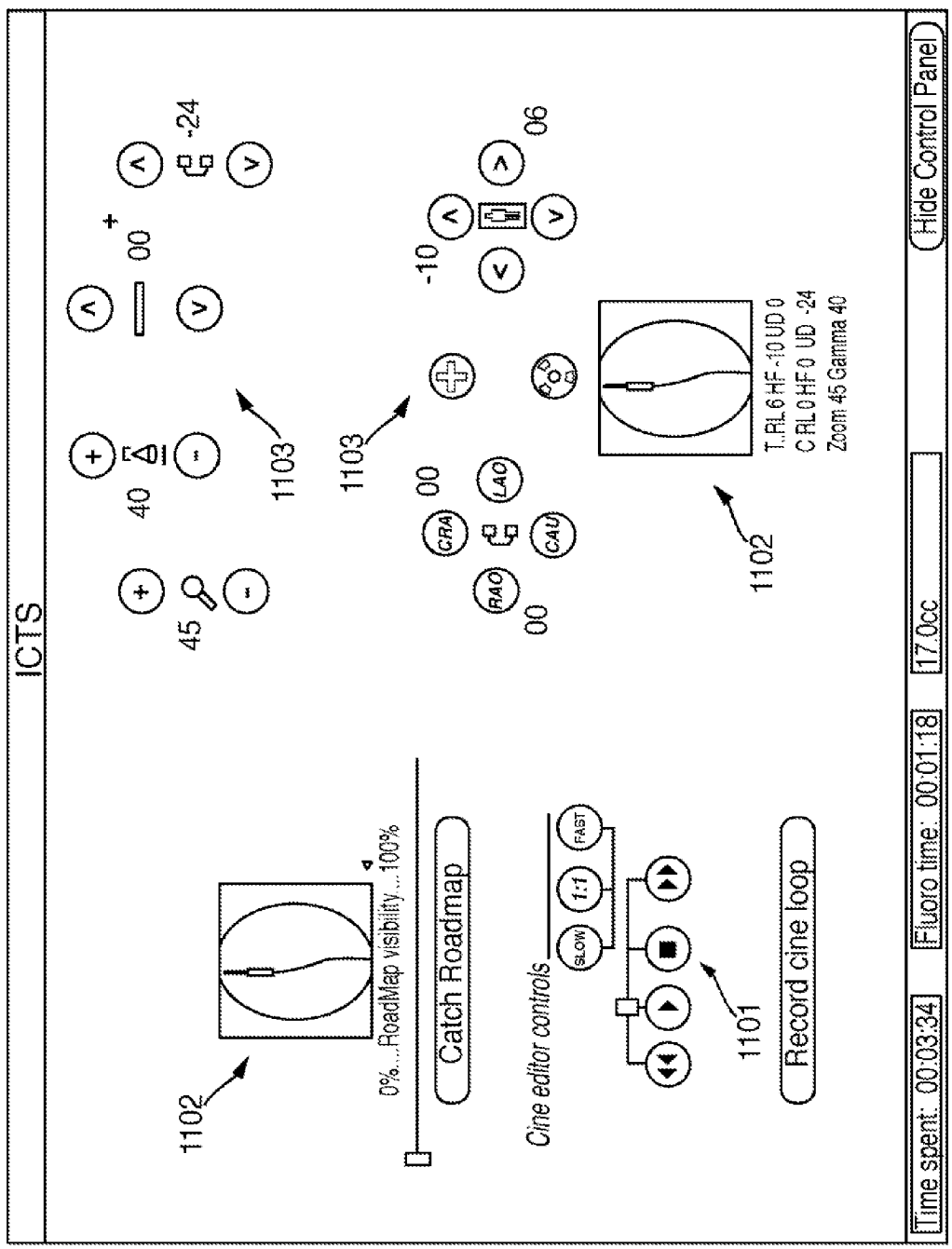

The apparatus further comprises a man-machine-interface for communication with the user. FIGS. 10 and 11 are two screen examples. The user interface UI consists of instructional material that guides the user through the procedure and can be very different depending on the user's needs. According to FIG. 10, a user can select between a numbers of functions in field 1011 and choose a tool and its type in a tool field 1012. FIG. 11 illustrates an image of the fluoroscope interface, comprising control field 1101 fluoroscope images 1102 and image recording control field 1103.

Figure 4:
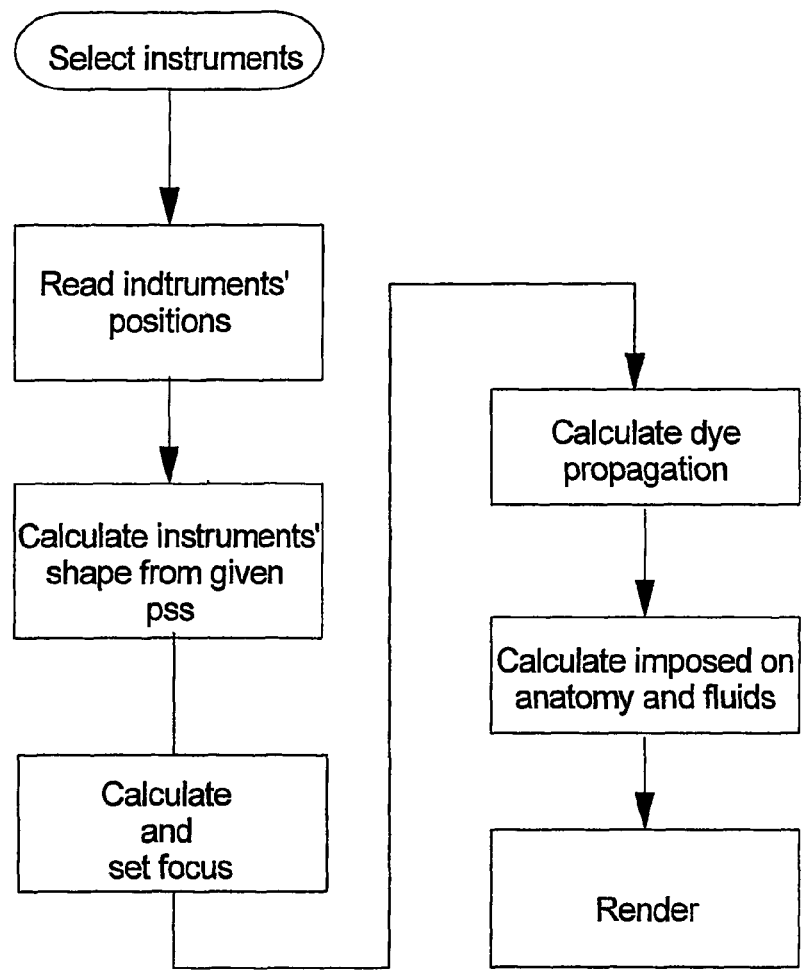
FIG. 4 is a flow diagram illustrating functional steps of a part of the invention.

Referring now to the flow diagram of FIG. 4, the user selects what tools, he/she is going to use before doing so. The selection is sent to the kernel, which might pass it on to an interface device, for instance. For simulation, the interface device needs to know what instruments to expect to function properly. The kernel then uses the properties of that particular instrument in all of its calculations and renderings 250. The kernel also feeds back information to the user interface, such as time, fluoro time, amount of contrast used, tip forces, balloon/vessel ration, etc. This information can be used to give the user different types of feedback.

The rendered image resembles the real fluoroscopic image, in a conventional way. During the procedure, the inclination of the X-ray tube can be changed, the table the "patient" is lying on can be moved, the zoom can be changed, brightness adjusted, etc., as on a real fluoroscope. It can be done using control inputs on a screen, using a joystick or using a real fluoroscopic panel.

Recordings, so called cine loops, can also be done, as well as road maps, i.e. still images that can be used for guidance later on in the procedure.

In the following, the invention will be described in conjunction with a number of non-limiting examples:
Coronary Balloon Dilatation (PTCA)/Stenting
The specific tool set for this application consists of:
Guiding catheter,
guide wire 0.035",
coronary wire 0.014",
balloon dilatation catheter,
and balloon expandable stent.

Also, distal protection can be used. The balloon and the stent can be used in same way; the balloon (also for the stent) interacts with the vessel, which expands (see above). The blood flow changes, and the contrast when injected. The stent is simulated in such a way that it is visible and stays in place as the balloon is deflated. It is also possible to enter with a larger balloon and inflate it again. This will influence both the stent and the vessel, so-called post dilatation. It is also possible to first inflate a balloon, before using a stent, so-called pre dilatation. Simulation is achieved by using force feedback, whereby a tight lesion is felt, when going through with a "large" balloon.

The procedure is done in such a way that first the guide catheter and guide wire are advanced to access either the right or left coronary vessel tree. Contrast is then injected through the catheter to locate the lesion/stenosis. The view can be changed to obtain a perfect visualization of the lesion. Images can also be exported to and be used by a separate QCA (Qualitative C Assessment) program, for length and width measurement. Then the user can decide what sizes of balloon/stent he/she wants to use. (Typically, some cine loops are recorded before and after balloon dilatation/stenting.) A thin guide wire (coronary wire) is first advanced through the catheter and into the vessel tree. The tip of the wire can be shaped in an angle (user selectable), and the wire is then steered through the vessel tree by rotating the wire, and pulling/pushing to find the right way past the lesion. The balloon/stent is then advanced on top of the wire, and positioned in the right place using the radioopaque markers. Contrast can be injected to see that it is positioned in the right place. Finally, the balloon/stent is inflated, held for some time, and then deflated. All the steps are simulated and can be performed as in real life.

Over-the-Wire Lead Placement:

The specific tool set for this application consists of:
Guiding catheter,
guide wire 0.035" (optional),
venogram balloon,
"coronary" wire 0.014",
lead, and
finishing wire.

Specifically, the venogram balloon is used to block the flow and allow contrast be injected on the opposite side of the balloon. In this case, it is assumed that we are in the veins and the blood flows in the opposite direction to what is desired to visualize the vessels. The lead wedges in place, both visually and using force feedback.

The procedure is as follows: The guide catheter is advanced to find the entry to the great cardiac vein (coronary sinus). Contrast is used to locate this. Then the vein is blocked with a balloon to visualize the side branches of the vessels, where the lead is going to be placed. The balloon is retracted, a 0.014" guide wire inserted (same procedure as above to navigate). Finally, on top of the wire the lead is advanced until it wedges in place. This can be seen and felt. Then the wire is removed. A finishing wire is inserted (or a lead extension), which is only used to hold the lead stable as the guiding catheter is removed.

In case of self-expandable stents, they are covered with a sheath, which is then retracted and the stent expands to a given size (but as it hits the vessel wall the final size will be dependent of the vessel "stiffness" and the properties of the stent itself). The properties of the stent, both visually, the way it expands and the effects it has on the vessel are simulated. The vessel can also be post dilated with a "regular" balloon afterwards.

A distal protection device stops emboli from moving further and block very small vessels (which can be devastating in the brain). A filter "basket" can then be used attached to a wire and at first covered with a sheath. The wire and sheath is positioned past the lesion, and then the sheath is retracted, leaving the basket as a protection for when the lesion is dilated. Afterwards a recovery sheath is advanced to close the basket and the two are together retracted. The behavior of the distal protection device is simulated, comprising how one handles it and the visible characteristics. Other types of protection devices are also possible to simulate, for example balloons that block the flow while dilating.

Tool shaping tool, is a result of having tools inside of each other with different shapes and stiffness, but it is being used many times and is difficult to simulate with other approaches than according to the present invention: Take a tool with a shape, a catheter for instance, and insert another tool, a stiff wire or a thinner catheter. As the inner tool is advanced, the shape of the outer tool is changed. This behavior comes "natural" in the present system, since the tools can move independently and the outmost shape is a result of all inner tools' stiffness/collisions.

According to the invention, it is also able to simulate tools that do not exist. This can be used for testing non-existing new tools. Thus, it is possible to prototype the new features, e.g. a new sensor at the tip or a completely new "smart" shape, etc. Then physicians can try the new tools (the interface device does not have to have the exact tool, the kernel will simulate the desired properties and change the apparent physical properties in real-time), and the system can measure whether the new features are used or not, compare the results to "standard" methods, etc. Besides interviewing the physicians and obtain their subjective opinions, there is also a way of obtaining objective measurements on the interaction between humans and instruments.

According to one aspect of the invention, a system for an interventional procedure simulation is provided. The system comprises a control unit and an interface unit, the system further comprising: means for communication between the control unit and the interface unit, means in the interface unit to simulate handling of a number of instruments simultaneously interfaced by the interface unit, interface member for receiving input from the user, means for handling and processing the input, means for controlling the interface, a first database for storing characteristics for the instruments, a second database for storing characteristics about a body part to be simulated, and means for generating control signals relating to an interaction between the simulated instruments and a surrounding geometry relating to a part of the simulated body part. The characteristics about a body part to be simulated are obtained through a scanning process.

The invention is best realized as a computer program for interventional procedure simulation in a system comprising a control unit and an interface unit, and the program comprises: a communication instruction set for communication between the control unit and the interface unit, a first instruction set for simulating handling of a number of simulated instruments simultaneously interfaced by the interface unit, the control unit further comprising an instruction set, comprising: a second instruction set for handling and processing input from the user, a third instruction set for controlling the interface, a first data set comprising characteristics for the instruments, a second data set comprising data on a body part to be simulated, a fourth instruction set for generating control signals relating to an interaction between the simulated instruments and a surrounding geometry relating to a part of the simulated body part, and a fifth instruction set for outputting simulation on a visualisation member.

The invention also concerns a program storage device readable by a machine and encoding a program of instructions for executing the computer program for interventional procedure simulation.

The invention also concerns a computer readable medium having computer readable program code embodied therein to enable an interventional procedure simulation in a system comprising a control unit and an interface unit, the program comprising: a communication instruction set for communication between the control unit and the interface unit, a first instruction set for simulating handling of a number of simulated instruments simultaneously interfaced by the interface unit, the control unit further comprising an instruction set, comprising: a second instruction set for handling and processing input from the user, a third instruction set for controlling the interface, a first data set comprising characteristics for the instruments, a second data set comprising data on a body part to be simulated, a fourth instruction set for generating control signals relating to an interaction between the simulated instruments and a surrounding geometry relating to a part of the simulated body part, and a fifth instruction set for outputting simulation on a visualisation member.

Moreover, the invention relates to a propagated signal for comprising a digitalized program code embodied therein to enable an interventional procedure simulation in a system comprising a control unit and an interface unit, the program comprising: a digitalized communication instruction set for communication between the control unit and the interface unit, a digitalized first instruction set for simulating handling of a number of simulated instruments simultaneously interfaced by the interface unit, the control unit further comprising an instruction set, comprising: a digitalized second instruction set for handling and processing input from the user, a digitalized third instruction set for controlling the interface, a digitalized first access code for accessing a first data set comprising characteristics for the instruments, a digitalized second access code for accessing a second data set comprising data on a body part to be simulated, a digitalized fourth instruction set for generating control signals relating to an interaction between the simulated instruments and a surrounding geometry relating to a part of the simulated body part, and a digitalized fifth instruction set for outputting simulation on a visualisation member.

The invention also relates to a system for an interventional procedure simulation, the system comprising a control unit and an interface unit, the system further comprising: means for communication between the control unit and the interface unit for receiving at least one instrument used in the interventional procedure, means for receiving three-dimensional information on a body part to be simulated, means for generating control signals relating to an interaction between the instruments and a surrounding geometry relating to a part of the simulated body part. The three-dimensional information is obtained through a scanning process.

The invention also relates to a system for an interventional procedure simulation learning, the system comprising a control unit and an interface unit, the system further comprising: means for communication between the control unit and the interface unit for receiving at least one instrument used in the interventional procedure, means for receiving three-dimensional information on a body part to be simulated, means for generating control signals relating to an interaction between the instruments and a surrounding geometry relating to a part of the simulated body part, and means for recording the simulation.

The invention also relates to a method of an interventional procedure training, using a system comprising a control unit and an interface unit, the method comprising: using an interventional procedure tool to be simulated in the interface device, simulating an interaction between the instruments and a surrounding geometry relating to a part of the simulated body part, using the simulation for training the user.

According to one aspect of the invention a method of facilitating an interventional procedure training, is provided by leasing a system comprising a control unit and an interface unit, the method comprising: using an interventional procedure tool to be simulated in the interface device, simulating an interaction between the instruments and a surrounding geometry relating to a part of the simulated body part, and using the simulation for training the user.

The invention is not limited to the shown embodiments but can be varied in a number of ways without departing from the scope of the appended claims and the arrangement and the method can be implemented in various ways depending on application, functional units, needs and requirements etc.

The invention claimed is:

1. An interventional procedure simulation system, having a control unit and an interface unit, said control unit being a conventional computer communicating with said interface unit to simulate handling of a number of real nested instruments simultaneously interfaced by said interface unit and, said instruments being arranged to move and rotate independently of each other and said movements and rotations being propagated to the other instruments, said control unit including an instruction set comprising:
   a first instruction set for handling and processing an input from a user, based on said input, generating a second instruction set for controlling said interface,
   a first data set comprising characteristics for said instruments,
   a second data set comprising data on a body part to be simulated,
   a third instruction set for generating control signals relating to an interaction between said simulated instruments as well as between said simulated instruments and a surrounding geometry relating to a part of said simulated body part, said third instruction set being adapted to calculate an effect of said interaction on a shape of one or more of said simulated instruments,
   a fourth instruction set for controlling movements of a number of serially arranged and interconnected carriages corresponding to movements of said instruments in said interface unit, each carriage comprising:
      members to receive and lock at least one of the instruments, and members for receiving a movement from an instrument dummy and generating a force feedback to the instrument dummy with respect to a simulation characteristic,
      a detecting arrangement for detecting the type of instruments inserted through an interconnecting member,
      a driving device to provide the movement of each carriage and regulate the movement by means of a speed regulator and a distance regulator, the driving device having a crank block arranged on a torque wheel, and
      an outlet, which is provided with a detecting member, configured to detect presence of at least one instrument in the carriage, said detecting member being arranged to detect the thickness of each instrument,
   a fifth instruction set for calculating an effect of a first instrument inserted into a second instrument in a nested manner, each instrument having properties of at least one of a natural shape, stiffness, length, diameter and radioopacity, said instruction set being configured to calculate movements of said first instrument propagated to the second instrument and
   a sixth instruction set for modeling testing previously unknown tools by prototyping new tool features and simulating desired tool properties, wherein physical properties of the previously unknown tools are adapted to be changed in real-time.

2. The system of claim 1, wherein said interventional procedure is at least one of a diagnostic, a cardiovascular or endovascular simulation system.

3. The system of claim 1, wherein the shape of at least one of said simulated instruments is calculated using dynamic vectors.

4. The system of claim 3, wherein for each instrument collisions with simulated surrounding calculations are executed by said control unit, which affects the shape and position of said instrument in said simulated body part.

5. The system of claim 1, wherein an instrument is a distal part of a tool or an end of a tool.

6. The system of claim 1, wherein different instrument types are used comprising at least one of balloons, stems, electrodes, wires, catheters, and distal protection.

7. The system of claim 6, wherein each instrument type has different properties associated to it and provided as an instruction set, which describes substantially all properties of said instrument.

8. The system of claim 6, wherein the properties of said instruments further describe interaction with at least one of surrounding geometry, visual properties, stiffness, and shape.

9. The system of claim 8, wherein simulated properties of said instrument are altered in real-time.

10. The system of claim 1, wherein the system comprises a model used for rendering objects depending on properties to be displayed and a collision model for computing collisions between the simulated instrument and body part.

11. The system of claim 1, wherein a model of said body or part of said body part is a three-dimensional data obtained through a body scanning.

12. A method for simulating an interventional procedure, the method being capable of being executed on a conventional computer, said method comprising the steps of:
providing a control unit and an interface unit, said control unit communicating with said interface unit to simulate handling of a number of nested real instruments simultaneously interfaced by said interface unit and that each nested instrument is configured to be moved and rotated independently of the other, and said movements and rotations are propagated to other instruments, and said interface unit including an instruction set for controlling movements of a number of serially arranged and interconnected carriages, corresponding to movements of said instruments in said interface device each carriage comprising:
members to receive and lock at least one of the instruments, and members for receiving a movement from an instrument dummy and generating a force feedback to the instrument dummy with respect to a simulation characteristic,
a detecting arrangement for detecting the type of instruments inserted through an interconnecting member,
driving device to provide the movement of each carriage and regulate the movement by means of a speed regulator and a distance regulator, the driving device having a crank block, arranged on a torque wheel, and
an outlet, which is provided with a detecting member, configured to detect presence of at least one instrument in the carriage, said detecting member being arranged to detect the thickness of each instrument,
providing a first instruction set for handling and processing input from a user,
generating a second instruction set based on said input, for controlling said interface,
retrieving information on said instrument comprising a first data set comprising characteristics for said instruments,
providing a second data set comprising data on a body part to be simulated,
generating control signals relating to interaction between said instrument and another instrument as well as between said instrument and a surrounding geometry by a third instruction set, said third instruction set being adapted to calculate an effect of said interaction on a shape of said instrument,
controlling movements of a number of serially arranged and interconnected carriages corresponding to movements of said instruments in said interface unit,
calculating an effect of a first instrument inserted into a second instrument in a nested manner, each instrument having properties of at least one of a natural shape, stiffness, length, diameters and radioopacity,
calculating movements of said first instrument propagated to the second instrument, and
modeling and testing previously unknown tools by prototyping new tool features and simulating desired tool properties, wherein physical properties of the previously unknown tools are adapted to be changed in real-time.

13. The method of claim 12, wherein the shape of said instrument is calculated using dynamic vectors.

14. The method of claim 12, wherein an instrument is a distal part of a tool or an end of a tool.

15. The method of claim 12, wherein different instrument types are used comprising at least one of balloons, stents, electrodes, wires, catheters and distal protection.

16. The method of claim 15, wherein each instrument type has different properties associated to it and provided as an instruction set, which describes substantially all properties of said instrument.

17. The method of claim 15, wherein the properties of said instruments further describe interaction with at least one of surrounding geometry, visual properties, stiffness and shape.

18. The method of claim 15, wherein simulated properties of said instrument are altered in real-time.

19. A system for an interventional procedure simulation, said system having a control unit and an interface unit, the system comprising:
a communication interface configured to communicate between said control unit and said interface unit, said control unit being a conventional computer,
a simulation arrangement in said interface unit configured to simultaneously simulate handling of a number of nested instruments interfaced by said interface unit, each of said instruments being independently movable and rotatable,
a user input interface member configured to receive input from a user including an instruction set,
a processor configured to handle and process said input,
an interface controller arrangement,
a first database configured to store characteristics for said instruments,
a second database configured to store characteristics about a body part to be simulated,
a signal generating arrangement configured to generate control signals relating to an interaction between said simulated instruments as well as between said simulated instruments and a surrounding geometry relating to a part of said simulated body part, said control signals being adapted to calculate an effect of said interaction on a shape of one or more of said simulated instruments,
a controller configured to control movements of a number of serially arranged and interconnected carriages corresponding to movements of said instruments in said interface device, each carriage comprising:
members to receive and lock at least one of the instruments, and members for receiving a movement from an instrument dummy and generating a force feedback to the instrument dummy with respect to a simulation characteristic, a detecting arrangement for detecting the type of instruments inserted through an interconnecting member, a driving device to provide the movement of each carriage and regulate the movement by a speed regulator and a distance regulator, the driving device having a crank block, arranged on a torque wheel, an outlet, which is provided with a detecting member, configured to detect presence of at least one instrument in the carriage, said detecting member being arranged to detect the thickness of each instrument, and said computer is configured to simulate an effect of a first instrument inserted into a second instrument in a nested manner, each instrument having properties of at least one of a natural shape, stiffness, length, diameter, and radioopacity; said computer comprising instruction set configured to calculate movements of said first instrument propagated to the other second instrument and modeling and testing previously unknown tools by prototyping new tool features and simulating desired tool properties, wherein physical properties of the previously unknown tools are adapted to be changed in real time.

20. The system of claim 19 wherein said characteristics about a body part to be simulated are obtained through a scanning process.

21. A non-transitory computer readable medium having computer readable program code embodied therein to enable an interventional procedure simulation in a system comprising a control unit and an interface unit having a plurality of carriages, said program code being capable of being executed on a conventional computer, said program code comprising:

a communication instruction set for communication between said control unit and said interface unit, a first instruction set for simulating handling of a number of simulated nested instruments, independently movable and rotatable, simultaneously interfaced by said interface unit, said control unit further including an instruction set comprising:

a second instruction set for handling and processing input from a user, a third instruction set for controlling said interface, a first data set comprising characteristics for said instruments, a second data set comprising data on a body part to be simulated, a fourth instruction set for generating control signals relating to an interaction between said simulated nested instruments as well as between said simulated nested instruments and a surrounding geometry relating to a part of said simulated body part, said fourth instruction set being adapted to calculate an effect of said interaction on a shape of one or more of said simulated nested instruments, each carriage comprising:

members to receive and lock at least one of the instruments, and members for receiving a movement from an instrument dummy and generating a force feedback to the instrument dummy with respect to a simulation characteristic, a detecting arrangement for detecting the type of instruments inserted through an interconnecting member, a driving device to provide the movement of each carriage and regulate the movement by means of a speed regulator and a distance regulator, the driving device having a crank block, arranged on a torque wheel, and an outlet, which is provided with a detecting member, configured to detect presence of at least one instrument in the carriage, said detecting member being arranged to detect the thickness of each instrument;

a fifth instruction set for calculating an effect of a first instrument inserted into a second instrument in a nested manner, each instrument having properties of at least one of a natural shape, stiffness, length, diameter and radioopacity, said fifth instruction set being configured to calculate movements of said first instrument propagated to the second instrument, a sixth instruction set for outputting simulation on a visualization member, and a seventh instruction set for modeling and testing previously unknown tools by prototyping new tool features and simulating desired tool properties, wherein physical properties of the previously unknown tools are adapted to be changed in real-time.

22. A system for an interventional procedure simulation, said system including a control unit and an interface unit, the system comprising:

a communication arrangement configured to control communication between said control unit and said interface unit for receiving at least two nested real instruments including a first instrument inserted into a second instrument, used in said interventional procedure, a computer configured to receive three-dimensional information on a body part to be simulated, and an arrangement configured to generate control signals relating to an interaction between said first and second instruments as well as between said first and second instruments and a surrounding geometry relating to a part of said simulated body part, said control signals being adapted to calculate an effect of said interaction on a shape of one or more of said first and second instruments, said control signals being configured to control movements of a number of serially arranged and interconnected carriages corresponding to movements of said instruments in said interface device with respect to movements of said first instrument propagated to the second instrument, each carriage comprising:

members to receive and lock at least one of the instruments, and members for receiving a movement from an instrument dummy and generating a force feedback to the instrument dummy with respect to a simulation characteristic, a detecting arrangement for detecting the type of instruments inserted through an interconnecting member, a driving device to provide the movement of each carriage and regulate the movement by means of a speed regulator and a distance regulator, the driving device having a crank block, arranged on a torque wheel, and an outlet, which is provided with a detecting member, configured to detect presence of at least one instrument in the carriage, said detecting member being arranged to detect the thickness of each instrument, wherein said control unit is a conventional computer and controls modeling and testing previously unknown tools by prototyping new tool features and simulating desired tool properties, wherein physical properties of the previously unknown tools are adapted to be changed in real-time.

23. The system of claim 22, wherein said three-dimensional information is obtained through a scanning process.

24. The system of claim 1, comprising a mapping table executed in a pre-processor.

25. The system of claim 1, wherein the third instruction set generates control signals relating to calculating collisions between said simulated instruments and said simulated body part for only a part of each first tool that is outside a second tool in which the first tool is nested.

26. The system of claim 1, further including a seventh instruction set for modeling a color agent which calculates behavior of said color agent and keeps track of a position currently having enough concentration of contrast to be visualized.

27. The method of claim 12, further including modeling a color agent by calculating behavior of said color agent and keeps track of a position currently having enough concentration of contrast to be visualized.

28. The system of claim 19, wherein the computer is further configured to model a color agent and calculate a behavior of said color agent and keep track of a position currently having enough concentration to be visualized.

29. The non-transitory computer readable medium of claim 21, further including an eighth instruction set for modeling a color agent which calculates a behavior of said color agent and keeps track of a position currently having enough concentration of contrast to be visualized.

30. The system of claim 22, wherein the control unit controls modeling a color agent by calculating behavior of said color agent and keeps track of a position currently having enough concentration of contrast to be visualized.

* * * * *